May 20, 1958    T. M. STICKNEY ET AL    2,835,718
SENSING ELEMENT FOR THERMOCOUPLE PROBES
Filed Dec. 30, 1954
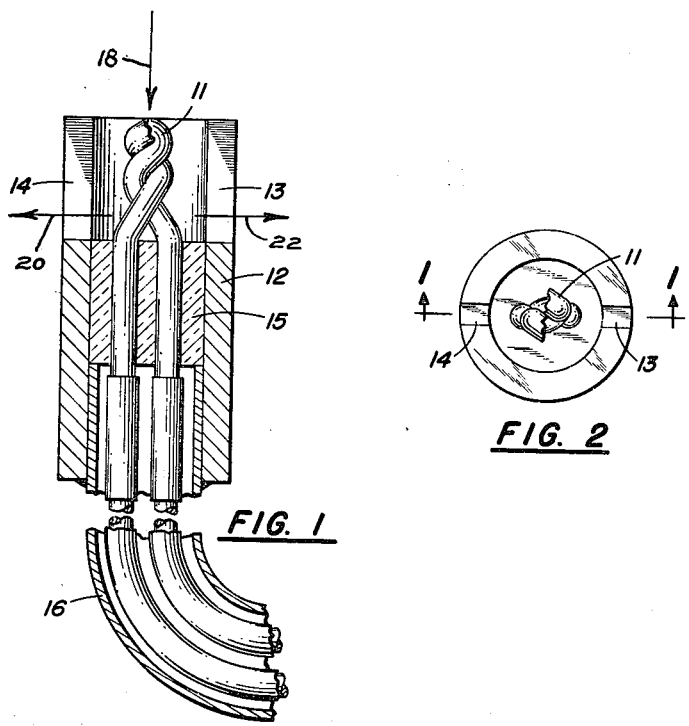
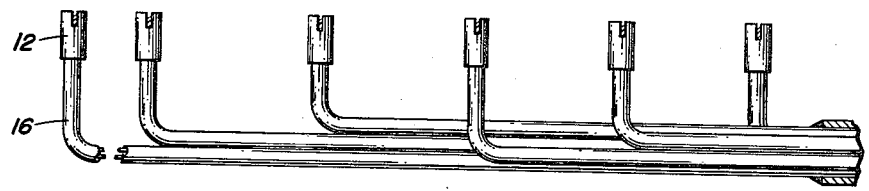
INVENTORS
TRUMAN M. STICKNEY
FRANCIS C. SCHWENK
BY
ATTORNEYS

United States Patent Office 2,835,718
Patented May 20, 1958

2,835,718
SENSING ELEMENT FOR THERMOCOUPLE PROBES

Truman M. Stickney, Parma, and Francis C. Schwenk, Cleveland, Ohio

Application December 30, 1954, Serial No. 478,944

3 Claims. (Cl. 136—4)

(Granted under Title 35, U. S. Code (1952), sec. 266)

The invention described herein may be manufactured and used by or for the Government of the United States of America for governmental purposes without the payment of any royalties thereon or therefor.

The present invention relates to a thermally sensitive electrical probe for gas stream temperature measuring systems and more particularly to a thermally sensitive electrical probe having a shield which produces an approximate adiabatic stagnation of the gas stream at the probe sensing element.

An accurate knowledge of the temperature existing at various points within a jet engine is very important in jet engine research. These measurements are generally obtained with instruments caled thermocouple probes which are inserted through the engine casing into the gas stream flowing through the engine. The probe consists of a sensing element or series of elements mounted on a support which is either fixed to the engine casing or mounted in an actuator fixed to the casing. Various types of sensing elements have been used in the past; namely, twisted bare wire, butt-welded bare wire, wedge or spike-shaped bare wire thermocouple junctions, and combinations of these junctions with a number of shield configurations. The design of the sensing element is governed by the flow characteristics of the gas in which it is to be used. Twisted bare wire elements are adequate for low velocity and low temperature streams but show high errors at high flow velocities and/or high temperatures. To obtain a zero-error total temperature sensing element, the stream must be completely stagnated adiabatically at the thermocouple junction. This cannot be done in practice but some type of partial stagnation device is generally used for sensing elements to be used in high velocity gas streams. The stagnation device generally consists of a shield or casing with large inlet area and small outlet area which is designed to give a low value of flow velocity at the junction and maximum insensitivity to angle of stream flow with respect to the probe.

Previous probes have had the disadvantages of: high fabrication cost; large size, which prevented the use of the probes in many tests; small outlet or bleed holes which became plugged by dirt and oil carried by the gas stream; poor reproductibility in manufacture which prevented standardization of probe calibrations.

The present invention consists of a thermally sensitive electrical element encompassed by a cylindrical shield having two diametrically opposed slots running in line with the shield axis to a specified depth. As a result of the simple structure the device can be made small and can be reproduced at a low cost. The large slot area lessens plugging. The advantages of low correction and angle insensitive features of existing stagnation-type designs are retained since the annular inlet area can be made larger than the slot outlet area to give stagnation, and the shield configuration is such as to give insensitivity to the angle of gas stream flow.

An object of the present invention is to provide a new and improved thermally sensitive electrical probe which avoids one or more disadvantages of prior probes of the type described.

Still another object is to provide a new and improved thermally sensitive probe which will have low correction and angle insensitive features.

A final object of the present invention is the provision of a new and improved thermally sensitive probe which can be made small, which is easily and cheaply reproducible, and is little affected by bleed-hole plugging.

Other objects and many of the attendant advantages of this invention will be readily appreciated as the same becomes better understood by reference to the following detailed description when considered in connection with the accompanying drawings wherein:

Fig. 1 shows a section of the probe taken on line 1—1 of Fig. 2 looking in the direction of the arrows.

Fig. 2 illustrates a top view of the probe.

Fig. 3 shows the use of several probes.

Referring now to the drawings, wherein like reference characters designate like or corresponding parts throughout the several views, there is shown in Fig. 1 (which illustrates a preferred embodiment) a thermocouple 11, which is the temperature sensing device. Partially surrounding the thermocouple is a cylindrical shield 12 with axial slots 13 and 14. The thermocouple wire extends into the insulated insert 15 and then through tubing 16 to the measuring circuit which is not shown. In Fig. 2 the cylindrical shield and slots are more clearly shown. Fig. 3 illustrates the use of several probes whereby measurements can be made simultaneously at many points in the gas stream.

The temperature sensing element is a heat sensitive electrical component such as a thermocouple or the like. The preferred thermocouple junction 11 should be placed on the shield axis and the twist should start as close as possible to the bottom of the slot and end at the top of the slot. The annular inlet area (cross-sectional area of the bore of cylinder 12) of the shield should be at least twice the outlet area of the slots so that sufficient stagnation can be obtained. The shield 12 and tubing 16 can be made of any heat resistant, structurally strong material in which a narrow slot can be milled. It has been found that stainless steel is suitable material. The insert 15 may be any form of insulation which is suitable for termination at the end of slots 13 and 14 in the cylindrical shield. For example, there is now available thermo-electric tubing which contains insulation and the thermocouple wires. Such tubing could be extended to the ends of the slots in the cylindrical shield. In this case, the insulation, strictly speaking, would not be an insert.

In use the shield and tubing are bent into the direction of flow. The gas stream enters the open end of cylinder 12 as indicated by arrow 18 and exits through slots 13 and 14 as indicated by arrows 20 and 22. The difference between shield inlet and outlet area results in a low flow velocity at the thermocouple junction so that the temperature of the junction follows closely the temperature of the gas stream. As is well known in the art, a thermocouple junction produces a voltage which is a function of the temperature of the thermocouple junction. The thermocouple junction 11 will thus generate a voltage which can be measured by a voltmeter and converted into a reading of the temperature of the gas stream at the point where the probe was placed.

This new and improved probe has very good over-all performance in subsonic, transonic, and supersonic flow; it permits small frontal area probe supports; it has good point reading characteristics; it will perform well in oily and dirty gas streams; it shows very good reproductibility; and it has a low fabrication cost.

Obviously many modifications and variations of the present invention are possible in the light of the above teachings. It is therefore to be understood that within the scope of the appended claims the invention may be practiced otherwise than as specifically described.

What is claimed is:

1. A probe comprising: an open ended cylindrical shell with diametrically opposed slots of equal length and width, each definining an area extending longitudinally from the open end of said shell, the cross-sectional area of the cylinder bore being more than twice the total area defined by said slots; an insulating insert closing the other end of said cylinder at the ends of said slots opposite the open end of said cylinder; and thermocouple means axially mounted within said cylinder coextensive to said slots.

2. A probe comprising: an open ended cylindrical shell with a diametrically opposed slots of equal length and width, each defining an area extending longitudinally from the open end of said shell, the cross-sectional area of the cylinder bore being more than twice the total area defined by said slots; a two-hole insulating insert closing the other end of said cylinder at the ends of said slots opposite the open end of said cylinder; and a twisted thermocouple junction located at the shell axis with two lead-in wires, the lead-in wires passing through the two holes of said insulating insert, and the twist of said thermocouple junction extending the length of said slots.

3. A probe for sensing temperature of a gas stream comprising: an open ended cylindrical shell with diametrically opposed slots of equal length and width, each defining an area extending longitudinally from the open end of said shell, the cross-sectional area of the cylinder bore being more than twice the total area defined by said slots; an insulating insert closing the other end of said cylinder at the ends of said slots opposite the open end of said cylinder; and thermocouple means axially mounted within said cylinder coextensive to said slots; said probe being oriented so that the gas stream will enter the open end of the cylinder and exit through the slots whereby a small portion of the gas stream is adiabatically stagnated.

References Cited in the file of this patent

UNITED STATES PATENTS

| 2,322,501 | Barnitz | June 22, 1943 |
| 2,335,471 | Ashcraft | Nov. 30, 1943 |
| 2,339,809 | Ray | Jan. 25, 1944 |
| 2,653,983 | Best | Sept. 29, 1953 |

FOREIGN PATENTS

| 628,590 | France | Oct. 26, 1927 |

OTHER REFERENCES

"The Testing of High Speed Internal Combustion Engines," by A. W. Judge, 1925 edition.